Jan. 19, 1960   J. G. KAY   2,921,412
ROTARY MACHINE FOR PROCESSING WORKPIECES
Filed Nov. 17, 1958   8 Sheets-Sheet 2
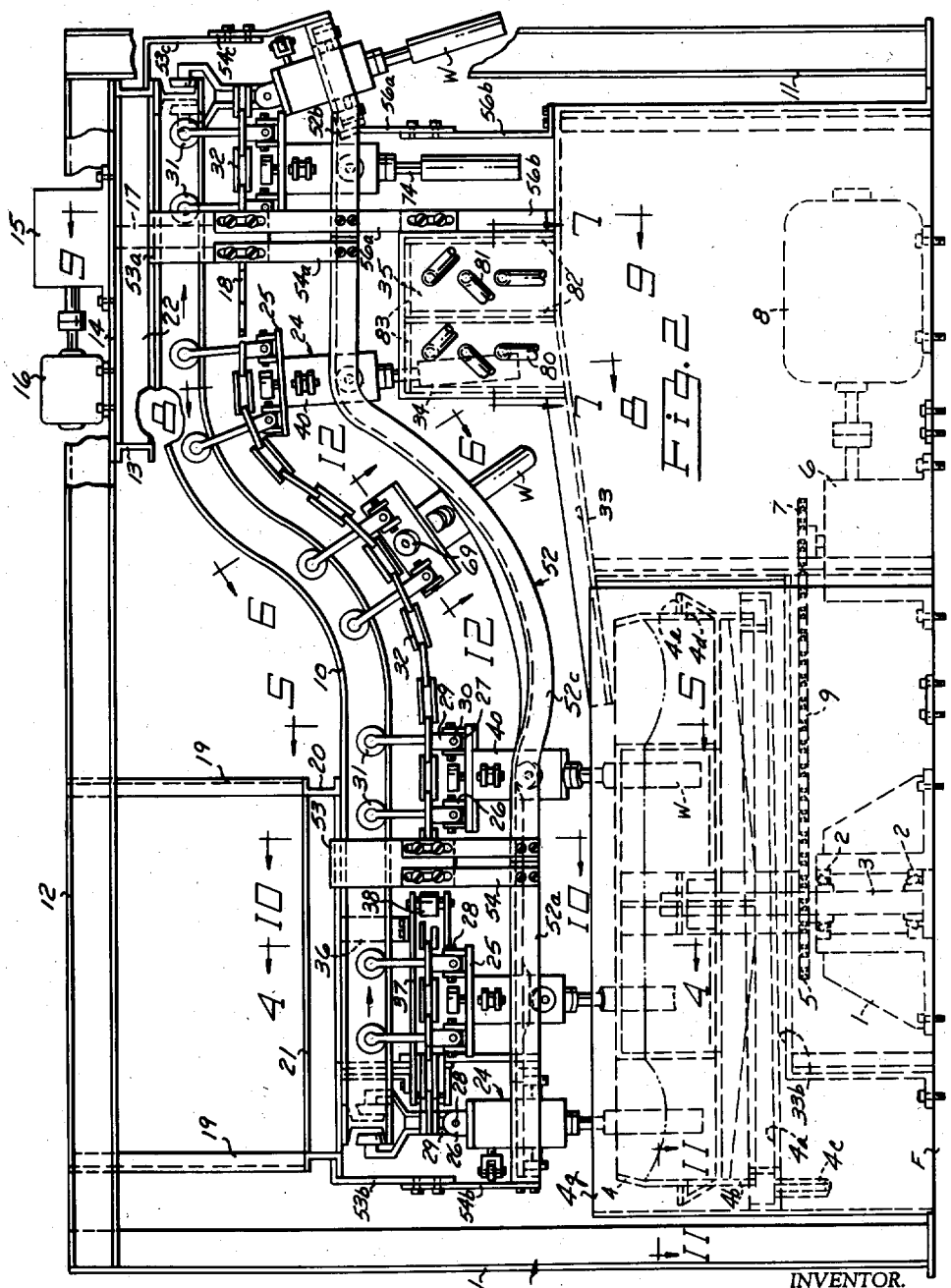
INVENTOR.
John G. Kay
BY
Attorney

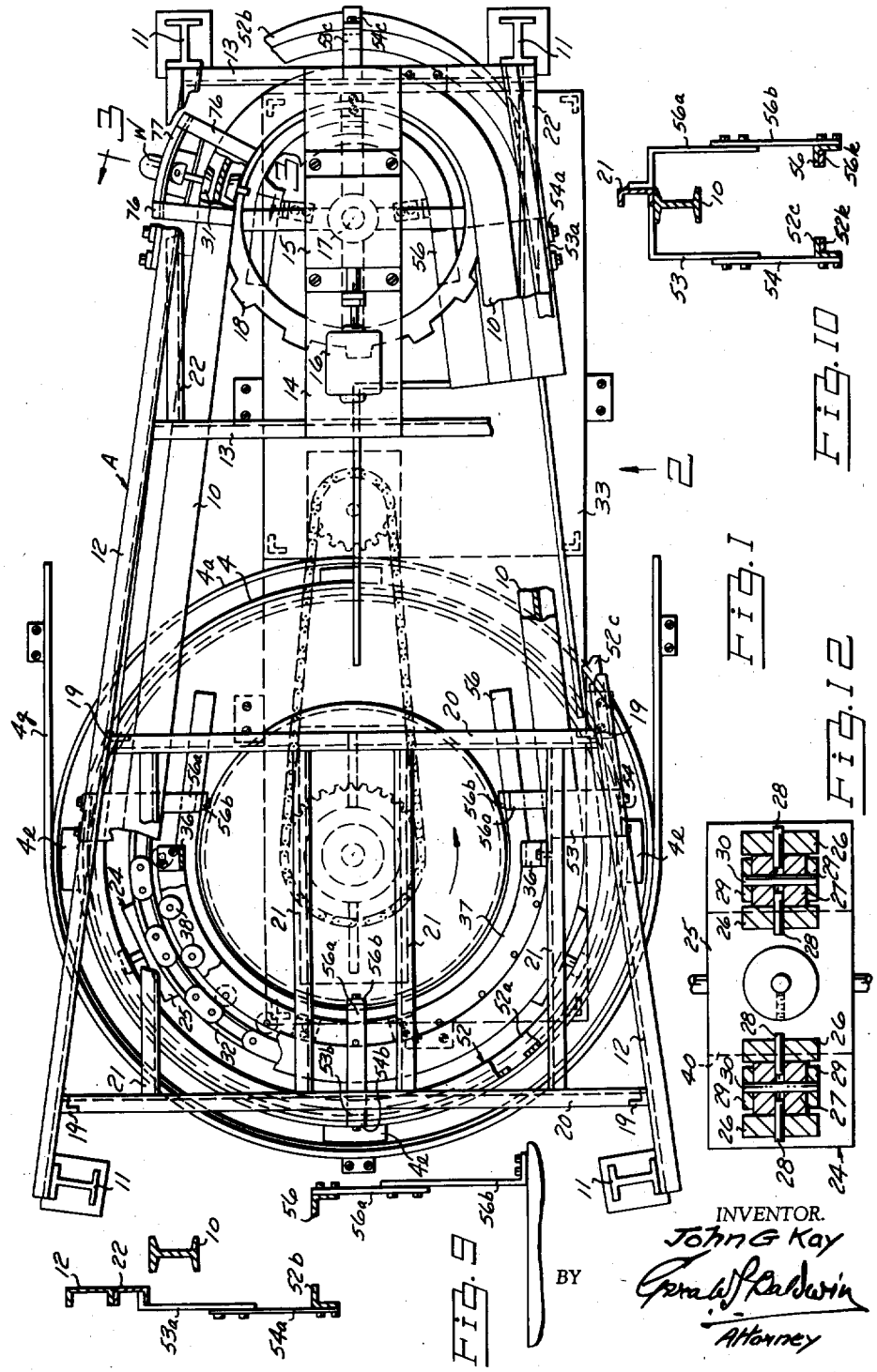

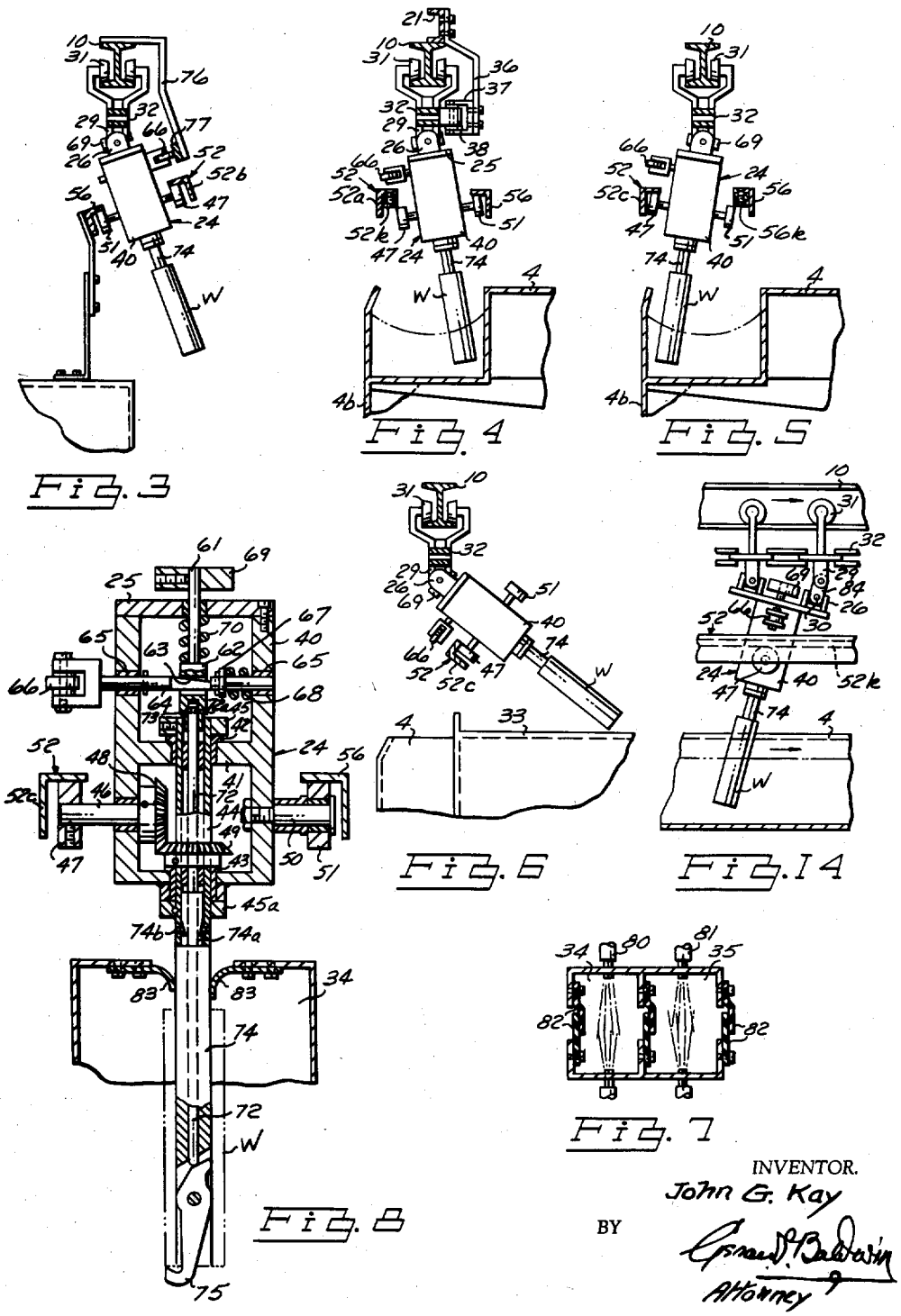

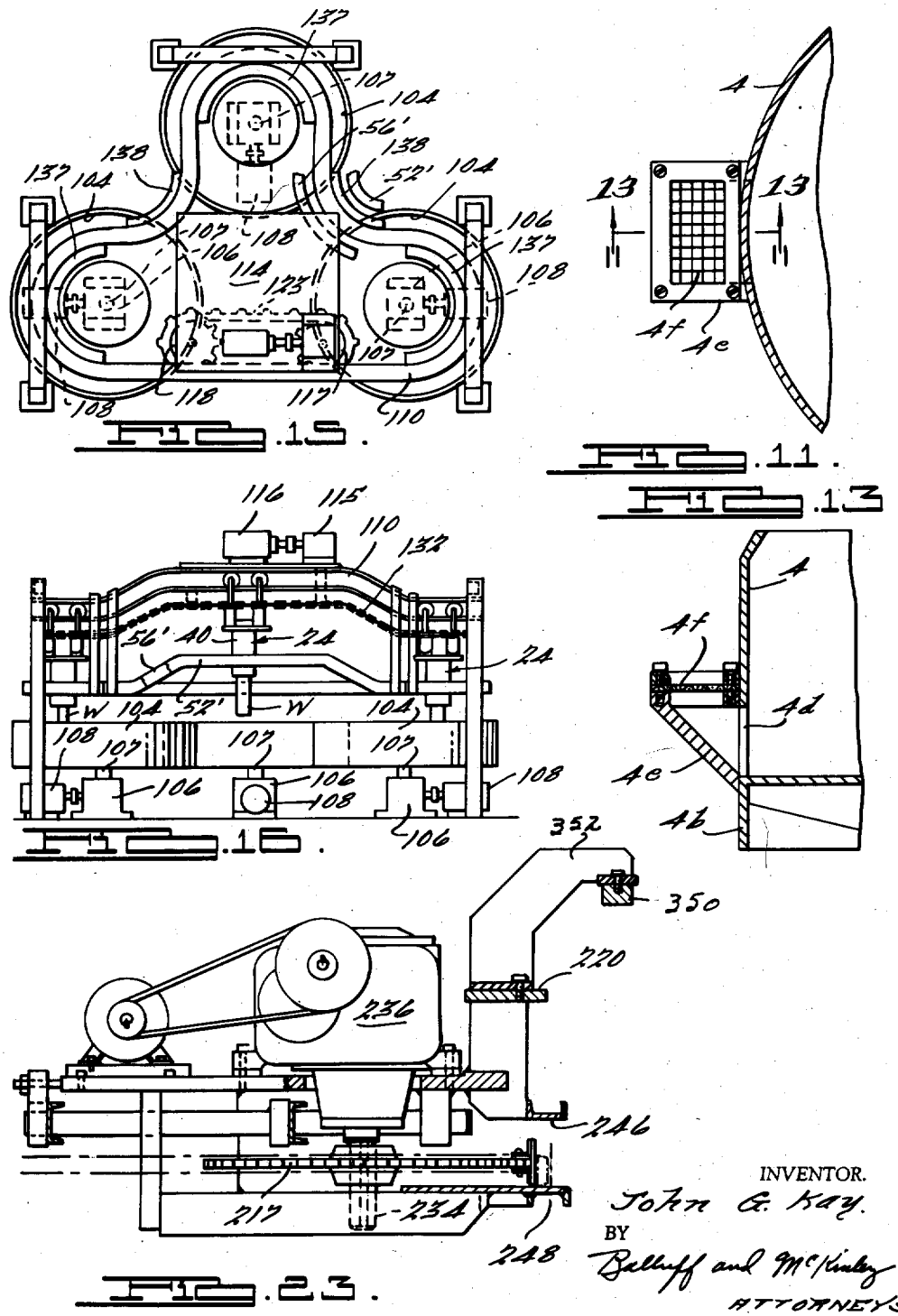

Jan. 19, 1960　　　　　J. G. KAY　　　　　2,921,412
ROTARY MACHINE FOR PROCESSING WORKPIECES
Filed Nov. 17, 1958　　　　　　　　　　8 Sheets-Sheet 5

INVENTOR.
John G. Kay.
BY
Balluff and McKinley
ATTORNEYS.

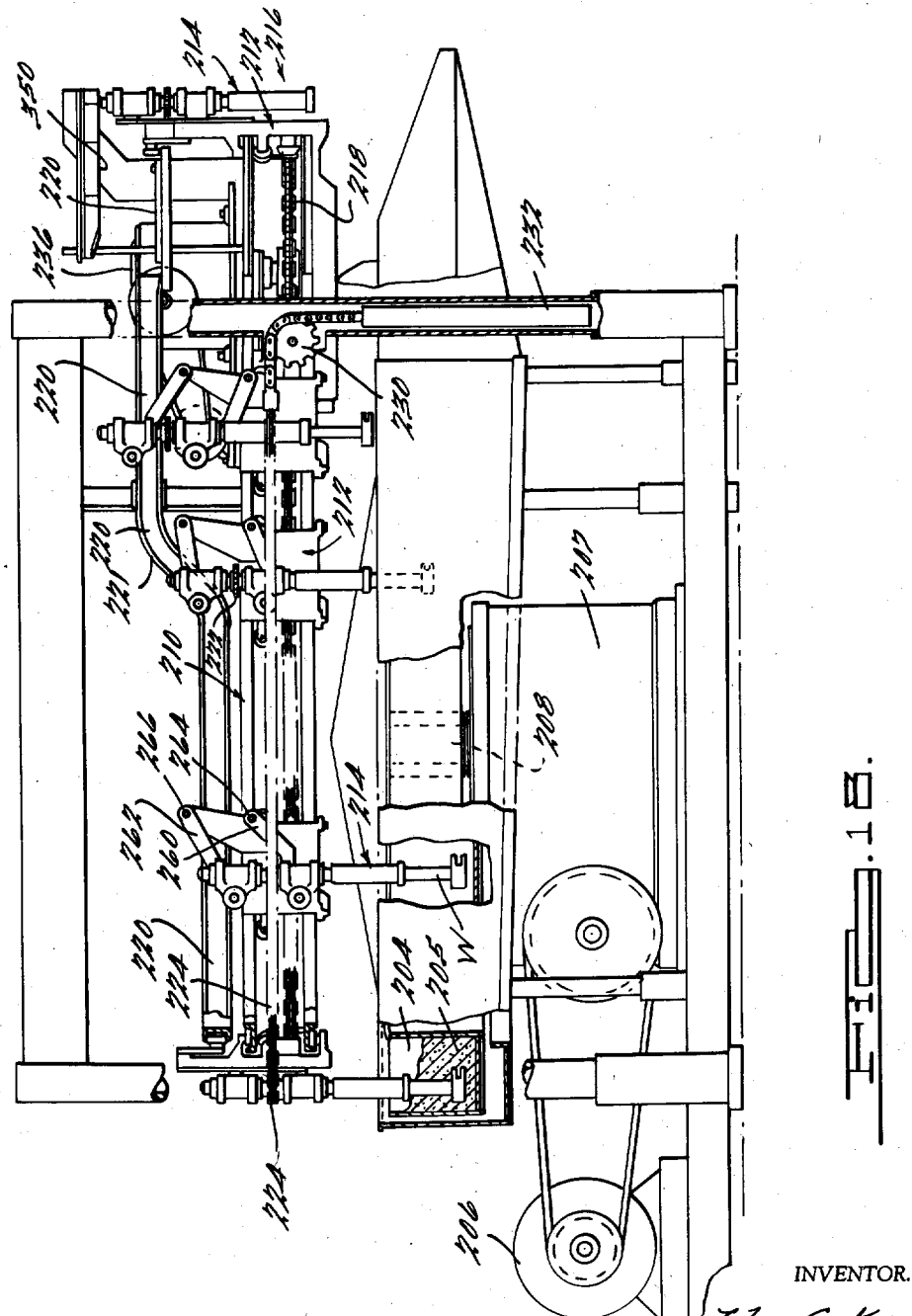

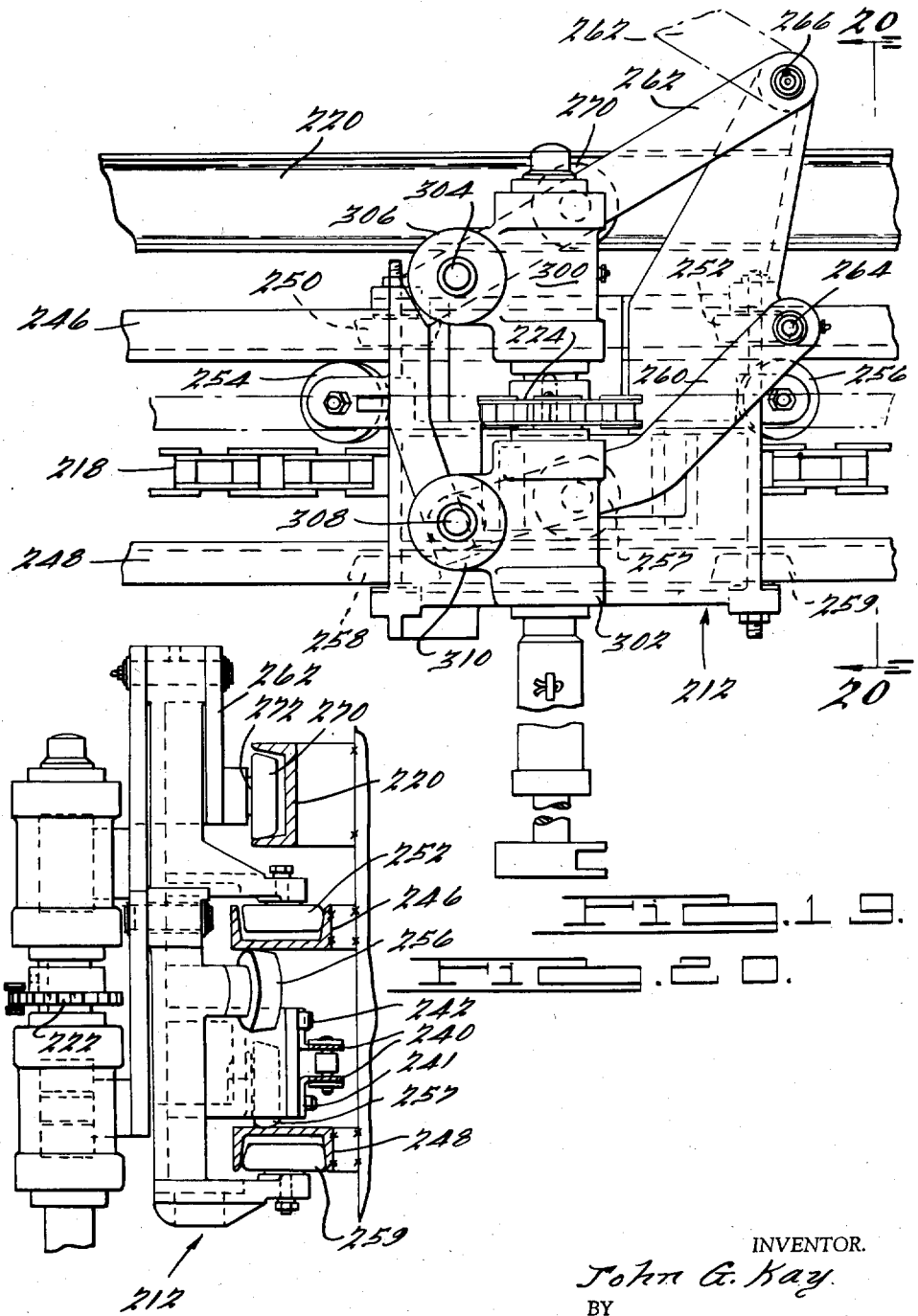

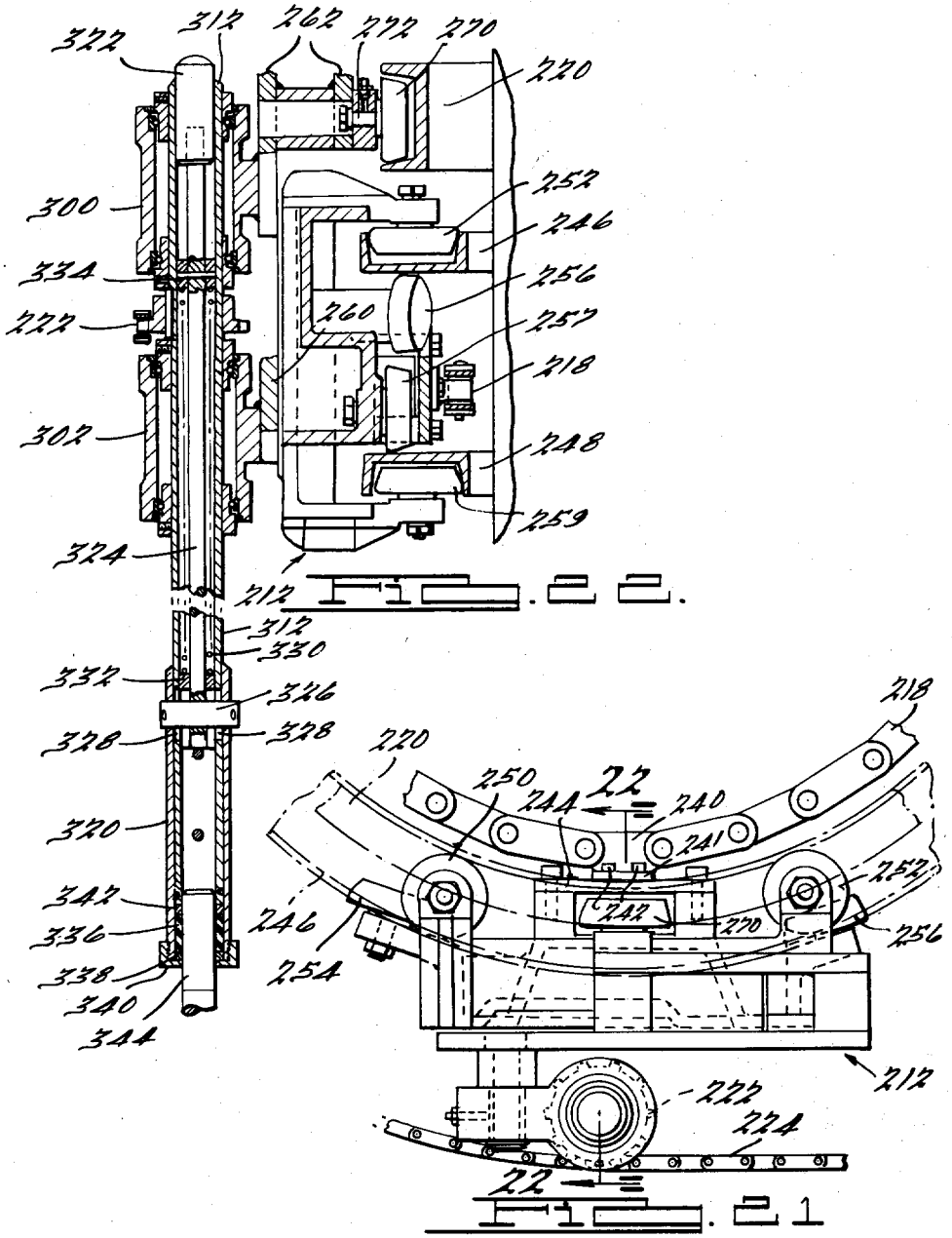

United States Patent Office 2,921,412
Patented Jan. 19, 1960

2,921,412
ROTARY MACHINE FOR PROCESSING WORKPIECES

John G. Kay, Detroit, Mich., assignor to F. Jos. Lamb Co., Warren, Mich., a corporation of Michigan Application November 17, 1958, Serial No. 775,676

21 Claims. (Cl. 51—7)

This invention relates to improvements in machines for removing burrs and rough edges from workpieces, and putting a smooth finish thereon.

This application is a continuation-in-part of my prior application Serial No. 746,163, filed July 2, 1958, for "Deburring Machine," now abandoned.

It is an object of the invention to provide such a machine, including a rotary trough having a mass of abrasive therein, with means for continuously circulating a plurality of spaced carriers around a continuous track a portion of which extends over the trough so that workpieces depending from the carriers and traveling through the abrasive are deburred and/or otherwise finished during a single turn around the track.

Another object of the invention is to provide such a machine wherein, as the work holding carriers move around the track, means cooperate therewith: to lower workpieces on the carriers into the abrasive in the trough; to raise them therefrom after the workpieces have traveled through said abrasive; and to release the means clamping the workpiece to its carrier when the latter is in the work loading station.

Yet another object of the invention is to provide such a machine wherein portions of the carriers are pivotally mounted to permit shifting thereof and the workpieces supported thereby to facilitate the insertion and removal of said workpieces into and from the trough.

Another object of the invention is to provide such a machine with means for moving or shifting the workpieces in the abrasive as they travel therethrough.

Another object of the invention is to provide such a machine with means for rotating the workpiece as it moves through the work processing material.

Another object of the invention is to provide such a machine including a washing compartment through which the workpieces are adapted to be transported after passing through the abrasive, with means for draining the liquid from the washing compartment back into the trough.

The invention also contemplates the use of a plurality of spaced rotary troughs through which and the abrasive therein workpieces are adapted to be consecutively transported by carriers traveling around a continuous track extending over the troughs; and includes means for washing each workpiece after it leaves each trough and draining the washing liquid and entrained fines into the last trough through which the workpiece has passed. Thus by providing abrasive of different coarseness in the troughs, workpieces may be thoroughly deburred and/or otherwise finished during a single cycle of their carirers around the track. This modification involves the use of a plurality of troughs from each of which the workpieces pass through a separate washing compartment and a separate means beneath each washing compartment for draining the washing liquid back into the trough immediately behind that washing compartment.

Other and further objects of the invention will be apparent from the following description and claims and may be understood by reference to the accompanying drawings, of which there are eight sheets, which by way of illustration show preferred embodiments of the invention and what I now consider to be the best mode of applying the principles thereof. Other embodiments of the invention may be used without departing from the scope of the present invention as set forth in the appended claims.

In the drawings:

Fig. 1 is a plan view of a machine embodying the invention;

Fig. 2 is a side elevation thereof;

Fig. 3 is a section on the line 3—3 of Fig. 1;

Figure 17:
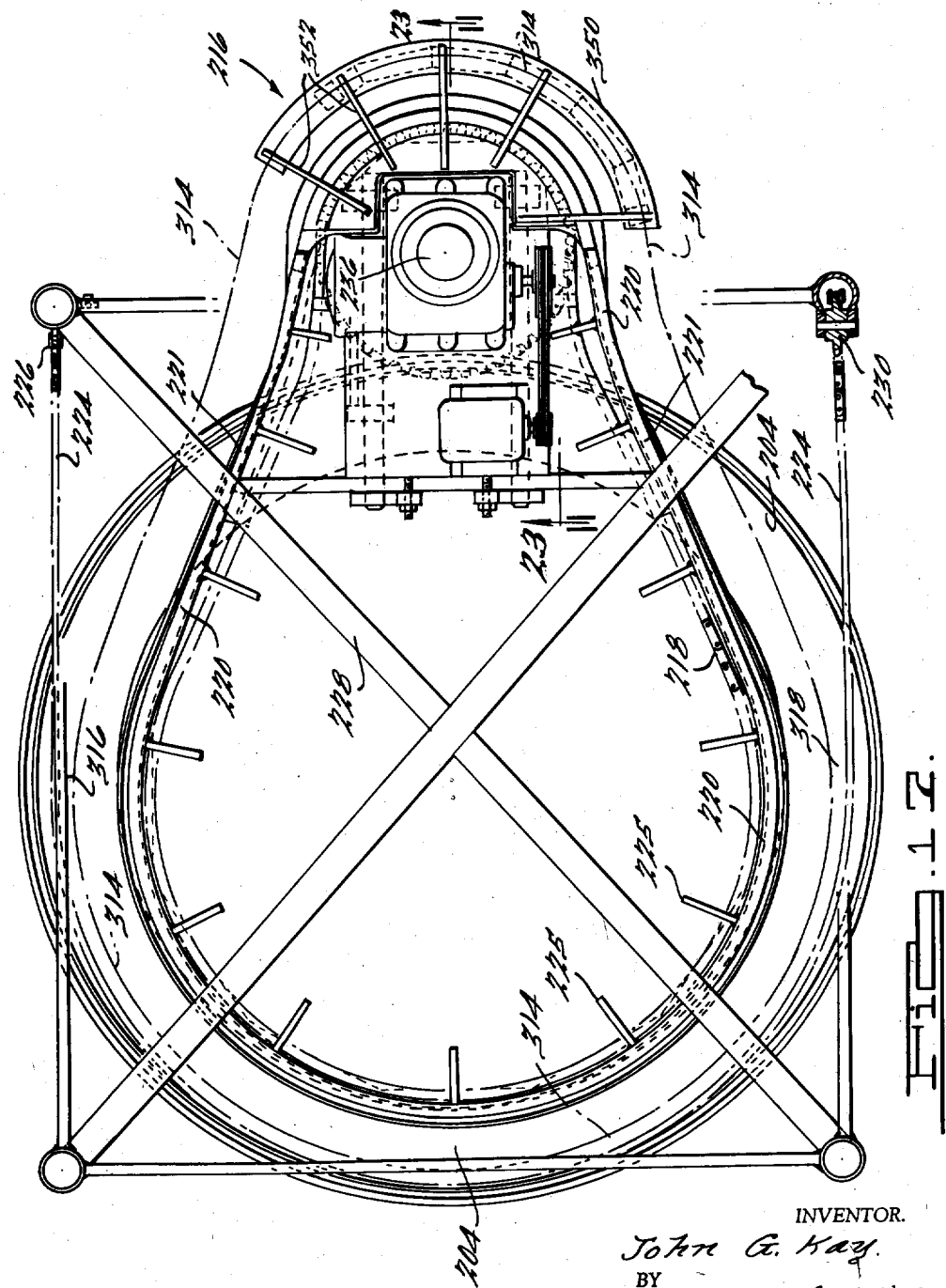

Figs. 4, 5 and 6 are sections on the lines 4—4, 5—5 and 6—6, respectively, of Fig. 2, each showing one side of the track and a carrier dependingly mounted thereon;

Fig. 7 is a section on the line 7—7 of Fig. 2 through the washing and drying compartments;

Fig. 8 is an enlarged sectional view on the line 8—8 of Fig. 2;

Figs. 9 and 10 are sections on the lines 9—9 and 10—10, respectively, of Fig. 2;

Figs. 11 and 12 are enlarged sections on the lines 11—11 and 12—12, respectively, of Fig. 2;

Fig. 13 is a section on the line 13—13 of Fig. 11;

Fig. 14 shows a slight modification of the universal coupling forming part of one of the carriers;

Fig. 15 is a plan view showing a modified form of the invention wherein the carrier track extends over a plurality of troughs;

Fig. 16 is an elevation thereof;

Fig. 17 is a plan view of a further modification of the invention, with some of the parts omitted;

Fig. 18 is a side elevational view of the machine shown in Fig. 17;

Fig. 19 is an enlarged elevational view of one of the carriers and part of the machine shown in Fig. 18;

Fig. 20 is a sectional view taken generally along the line 20—20 of Fig. 19;

Fig. 21 is a plan view of the parts shown in Fig. 19;

Fig. 22 is a sectional view taken generally along the line 22—22 of Fig. 21; and Fig. 23 is a fragmentary sectional view taken generally along the line 23—23 of Fig. 17.

Referring to Figs. 1 and 2 of the drawings, 1 designates a base adapted to be secured upon a floor F and having aligned vertical bearings 2 therein in which a shaft 3 is mounted for rotation. Mounted upon the upper extremity of the shaft 3 for rotation therewith is an annular trough 4 adapted for holding a mass of abrasive or other work processing material, and secured around the said shaft between the underside of the trough and the upper extremity of the bearing is a sprocket wheel 5. A speed reducer unit 6 having a sprocket wheel 7 thereon is secured upon the floor and is connected to an electric motor 8 by which it is driven. An endless chain 9 extends around the sprockets 5 and 7. Suitably secured, in the present instance upon the floor, is a frame A on which an endless monorail track 10 is supported. The track is higher at the right-hand extremity (Figs. 1 and 2) than the other so as to provide a zone for loading and unloading workpieces from the machine. At its lower extremity a segment of the track extends around substantially 180° coaxially with and above the trough 4, and at that end is usually of greater radius than at its opposite and higher end.

In the present instance the frame A includes the following: Vertical H-beams 11 project upwardly from the floor in which they are embedded, and extending between and secured to the upper extremities of longitudinally spaced pairs of the beams 11 are channel members 12 which are braced both at and adjacent one extremity of the frame by other transverse channels 13. Extending between and secured to the channels 13 intermediately of their length is a support 14 on which a speed reducer 15 and a motor 16 by which it is driven are mounted. Extending vertically downward from and forming part of the speed reducer 15 is a shaft 17 on the lower extremity of which a sprocket 18 is secured for rotation therewith. The shaft 17 is coaxial with the higher extremity of the track 10. Dependingly secured to the channel members 12 toward the lower end of the monorail track 10 and arranged in transversely aligned pairs are angle members 19. Extending across the frame and secured at opposite extremities to the angle members 19 are transverse horizontal channels 20 which are longitudinally braced by parallel channels 21. The track 10 adjacent its lower extremity is welded or otherwise secured to the underside of one of the transverse channels 20 and to the longitudinal channels 21. Adjacent its upper extremity the track is similarly secured to the underside of the outer transverse channel 13 and to longitudinal channels 22 which extend between the channels 13.

The track 10 is preferably of I-beam section and mounted for movement therealong are a plurality of carriers 24. Each carrier includes rollers 31 mounted for movement along the track 10, a universal coupling connecting the rollers to a plate 25 beneath, and a housing 40 dependingly secured to the underside of the plate. The coupling, which may be constructed as hereinafter described, permits pivotal movement of the housing 40 both laterally and longitudinally relative to the path of movement of the carriers 24 along the track 10. Projecting upwardly from each plate 25 are longitudinally spaced pairs of lugs 26 between each pair of which a block 27 (Fig. 12) is provided having longitudinally aligned openings formed therein from opposite ends to receive the inner extremities of pins 28 each of which also extends through one of the lugs 26. Projecting upwardly from immediately adjacent opposite sides of the block 27 are the lower extremities of arms 29 through which and the said block a pivot pin 30 extends, the axis of which is at right angles to and is intersected by the axis of the pins 28. The upper portions of the arms 29 extend outwardly and upwardly and support axially aligned rollers 31 on their inner sides for rotation along opposite sides of the lower flange of the track 10. Each pair of arms 29 also extend vertically through and are secured to one of the links of a conventional conveyor chain 32 which passes around the sprocket 18 and is driven thereby.

As shown in Fig. 2, the track 10 is vertically inclined intermediately of its length and is horizontal for some little distance from each extremity. The use of universal couplings, formed in this instance by the lugs 26, blocks 27, pins 28 and 30 and the arms 29, permits the plates to assume horizontal or different longitudinally inclined positions beneath the track 10. Furthermore, by providing means whereby the plates 25 may swing laterally relative to the track, it is possible to reduce the vertical distance which the plates must move to insert workpieces W dependingly supported by them into the trough 4, or remove the said workpieces therefrom. Dependingly supported from the channel members 21 by spaced brackets 36, Fig. 4, is a substantially semicircular guide 37 of channel section having spaced rollers 38 mounted therein about vertical axes. The inner side of the chain 32 bears against the rollers 38 as it travels around substantially 180° beneath the extremity of the track 10 remote from the sprocket 18.

Formed transversely in each housing 40 intermediately of its length is a horizontal wall 41 through which a bearing 42 extends, and mounted in the underside of the housing is another bearing 43. The bearings 42 and 43 are coaxial and support a hollow shaft 44 for rotation. Secured around the upper margin of the hollow shaft 44 is a collar 45 which rests upon the upper face of the bearing 42. Mounted for rotation radially through the housing 40 is a shaft 46 having a roller 47 fixed to its outer extremity and a bevel gear 48 secured to its inner extremity. Fixed around the hollow shaft 44 and having its underside resting upon the upper face of the bearing 43 is a bevel gear 49 which meshes with and is rotated by the bevel gear 48 as the roller is turned as hereinafter described. Secured to and projecting outwardly from the housing 40 is a fixed shaft 50 which is in radial alignment with the shaft 46, and mounted for rotation on the shaft 50 is a roller 51. The shafts 46 and 50 thus project from opposite sides of the housing 40 at right angles to its path of movement around the track 10. Secured around the shaft 44 adjacent its lower extremity is a collar 45a which bears against the underside of the housing 40.

To protect the motor 8, the speed reducer 6 and the chain 9, and prevent water and entrained fines and abrasive dropping onto them from workpieces traveling thereover, an inclined draining plate 33 is provided having upwardly projecting lateral margins and supported by legs resting upon the floor F. The lower extremity of the plate 33 projects over the outer edge of the trough around a portion of its circumference. Mounted on the plate 33 is a washing compartment 34 and a drying compartment 35 located beneath the track so that workpieces being transported by the housings 40 are carried through the said compartments and water, fines and abrasive which drop from the workpieces onto the plate run down the latter into the trough. Projecting at a lower elevation from beneath the lower end of the plate 33 is a plate extension 33b which extends over the driving chain 9 and the sprocket 5.

Suitably supported beneath the trough 4 is a somewhat horizontally inclined annular gutter 4a concentric with and extending outwardly somewhat from beneath the said trough. A skirt 4b is secured around the outer periphery of the trough and terminates at its lower extremity in the gutter 4a from the lowest portion of which a drain pipe 4c extends.

Formed through the outer side of the trough 4 and extending upwardly from the bottom of the latter for a portion of its height are a plurality of spaced vertical openings 4d, and secured exteriorly on the trough opposite each opening and projecting above the top of the latter is an upwardly and outwardly flared catch basin 4e. A screen 4f is secured horizontally across the top of each basin through which liquid and entrained fines are adapted to be ejected to pass into the gutter 4a and thence into the drain pipe 4c. The mesh of the screen is, however, too fine to permit the passage therethrough of abrasive from the trough. A substantially circular, stationary baffle wall 4g is secured upon the floor F outwardly of the trough and higher than the top of the latter to prevent liquid from the basins being discharged across the floor as the trough is rotated.

In order to vary the inclination of the housings 40 as they travel around the track 10, outer and inner guides 52 and 56 are provided for engagement by the rollers 47 and 51, respectively. The outer guide 52, in the present instance, is continuous and is uniformly spaced outwardly from and below the level of the track 10 so that the rollers 47 remain at all times in contact with it. The inner guide, on the other hand, may consist only of two separated and substantially semicircular sections extending around opposite extremities of the machine. The latter guide sections are substantially concentric with and inwardly spaced from and beneath the track. In both cases the guides 52 and 56 may consist of pieces of inverted angle section with their substantially horizontal flanges projecting inwardly and their substantially vertical flanges downwardly, so that the undersides of the horizontal flanges form bearing faces against which the rollers 47 and 51, respectively, are adapted to rotate as the carriers are drawn around their path of movement by the chain 32. From Figs. 3 to 5, inclusive, and Fig. 8, it will be seen that the opposed guides 52 and 56 usually have their horizontal, or substantially horizontal, flanges in transverse alignment, and where the inclination of the housings 40 is to be increased or decreased a longitudinally tapered pad or insert 52k, or 56k, may be secured to the underside of the guide 52, or 56, respectively, as shown in Figs. 4 and 5. However, other means may be employed for accomplishing this purpose.

The outer guide 52 is preferably made of a plurality of sections, including substantially semicircular end portions 52a and 52b, the adjacent extremities of which on each side of the machine are connected by an intermediate guide portion 52c. The adjacent extremities of each pair of outer guide portions 52a and 52c are connected to one another by upper and lower brackets 53 and 54 which also support the said guide portions upon the machine, as shown in Figs. 2 and 10. The upper bracket 53 is dependingly secured to the track 10, and the lower brackets 54, two of which are employed in this case, are attached to the upper bracket for vertical adjustment. Each lower bracket 54 is also secured to one of the outer guide portions 52a or 52c. The adjacent extremities of each pair of outer guide portions 52b and 52c are connected to one another by a similar arrangement of upper and lower brackets 53a and 54a, as shown in Fig. 9. In this case the upper bracket 53a is dependingly secured to one of the channels 22.

At one extremity of the machine the guide portion 52a is supported for vertical adjustment by a two-piece bracket 53b and 54b which is dependingly secured to one of the transverse channels 20, and at the opposite extremity the guide portion 52b is supported by a similar two-piece bracket 53c and 54c supported by one of the transverse channels 13. Similarly the inner guide portions 56 may be supported by suitable upper and lower brackets 56a and 56b, respectively.

Axially movable through the plate 25 and in the upper extremity of the housing 40 of each carrier 24 is a spindle 61 having a member 62 on its lower extremity through which a horizontal slot 63 is formed for the passage of a rod 64. This rod, which is materially smaller in cross section than the slot 63, is supported for axial movement in horizontally opposed bearings 65 mounted on opposite sides of the housing 40. The rod 64 is bifurcated at one extremity which projects outwardly beyond one of the bearings 65 and supports a roller 66 against which pressure is adapted to be exerted to force the rod inwardly relative to the housing. Intermediately of its length the upper face of the rod is inclined to engage the upper face of the slot 63 and force the member 62 and the spindle 61 upwardly when the said rod is moved axially in one direction. Between the bearing 65 remote from the roller 66 and a collar 67 secured around the rod 64 between the last-mentioned bearing 65 and the adjacent extremity of the slot 63 is a helical spring 68 which tends to force the bifurcated end of the rod outwardly and permit the spindle 61 and the member 62 to drop to their lowered positions. Secured around the top of the spindle 61 spaced above the plate 25 is a weight 69, and extending also around the spindle 61 between the underside of the said plate and the top of the member 62 is another helical spring 70. From the foregoing it will be seen that inward pressure exerted on the roller 66 raises the member 62 and the spindle 61, and that when the roller is released the spring 68 returns the roller to its outward position, whereupon the weight 69 and the spring 70 return the spindle and the member to their lower positions.

Formed in the underside of the member 62 is a recess coaxial with the spindle 61 into which the upper extremity of a push rod 72 extends. The push rod is held for independent rotation in the member 62 by a horizontal pin 73 which extends partly through the member 62 and partly through an annular groove 72a formed in the periphery of the push rod. Thus upon vertical movement of the spindle 61 the push rod is raised or lowered.

Insertable into the lower extremity of each hollow shaft 44 is the shank 74a of an adapter 74 which may be secured therein in any preferred manner, as by set screws 74b in engagement with and extending radially through the hollow shaft 44. The adapter is adapted to support a workpiece for rotation with the said shaft. When a carrier 24 travels around the track 10, its hollow shaft 44 and adapter are turned by the roller 47, which is in engagement with outer guide 52, and through the gearing 48 and 49. Pivotally mounted in the adapter 74 is an S-shaped retainer 75 which is adapted to be turned about its axis by downward pressure exerted against it by the push rod 72 so that one end of the retainer engages the underside of the workpiece W and the opposite extremity is forced into engagement with the bore of the workpiece to insure rotation of the latter with the adapter.

In Figs. 1 and 3 it will be noted that spaced brackets 76 are dependingly mounted on the track 10 at the loading end thereof. The brackets support opposite extremities of a rail 77 by which each roller 66 in turn is forced inwardly to lift the member 62 and spindle 61 with which it cooperates. When this occurs, the clamping pressure exerted against the retainer 75 by the push rod 72 is released and consequently a workpiece may be readily removed from the adapter and another mounted thereon. However, as soon as the roller passes beyond and is released from the rail 77, the member 62 and the push rod 72 return to their downward positions and the retainer 75 is again moved to its work engaging and clamping position.

Figs. 2 and 6 show how the guide 52 is employed to increase or decrease the vertical bodily movement of the housings and the adapters to facilitate their insertion or removal from the trough 4 and the abrasive therein. Preferably the chain 32 and the trough 4 travel in the same direction and the trough moves considerably faster than the chain. Consequently no difficulty is experienced in inserting workpieces into the abrasive or when lifting them therefrom. The abrasive is kept moist, and its coarseness or grit depends upon the workpieces being deburred or otherwise finished.

Projecting from opposite sides into the washing compartment 34 and the drying compartment 35 are discharge conduits 80 and 81, respectively. Through the conduits 80, water or other suitable liquid is discharged against workpieces as they pass through the compartment 34 to remove fines and abrasive therefrom, and compressed air is usually discharged through the conduits 81 to dry the workpieces as they pass from the compartment 34. Flexible, vertical partitions 82 are arranged in aligned, overlapping pairs in the sides of the compartments 34 and 35 to permit passage of the adapters and their workpieces therethrough, and similar overlapping flexible covers 83 are mounted on the tops of the compartments to keep the latter substantially closed.

Fig. 14 shows a modification wherein the housing 40 is rearwardly and downwardly inclined. In certain cases better results are obtained when workpieces are supported on adapters which are so inclined. To accomplish this a link 84 is pivoted at one extremity to one of the arms 29 and at its other extremity to the pin 30 beneath.

Figs. 15 and 16 show a modification wherein a plurality of spaced rotary troughs are provided consecutively through which the workpieces are transported as they travel from a loading to an unloading station so that complete deburring and finishing of the workpieces may be performed during a single cycle of the conveyor.

The modification schematically shown in Figs. 15 and 16 includes a plurality of annular rotary troughs 104, which are suitably spaced from one another. In the present instance, speed reducers 106 each driven by a separate motor 108 are secured to the floor one beneath each of the troughs. Extending vertically upward from each reducer is a driven shaft 107 upon which one of the troughs is secured for rotation therewith. Supported by a suitable frame which extends upwardly from the floor is an endless conveyor track 110 which extends through substantially 180° above and coaxial with the annular abrasive containing portion of each of the troughs 104. The links of an endless chain 132 paralleling track 110 are secured to carriers 24 mounted on the track 110 for moving such carriers therealong. The carriers 24 are constructed as hereinbefore described and include housings 40 and means depending therefrom for supporting workpieces W. Secured upon a support 114 attached to the frame of the machine is a speed reducer 115 and a motor 116 by which the reducer is driven. A drive sprocket 117 is fixed on a driven shaft extending from the speed reducer, and rotatably supported by the support 114 is a second sprocket 118 around which and the sprocket 117 an endless drive chain 123 extends. The latter is provided with drive lugs which engage the chain 132 and impart movement thereto whereby the carriers are moved around the track 110 so that the workpieces carried thereby will be successively moved through the abrasive in the troughs 104.

Suitable guide means insure that the chain 132 follows along a predetermined path and include substantially semicircular guides 137 similar to the guides 37 previously described and coaxial with the troughs 104, and between adjacent pairs of troughs similarly constructed arcuate guides 138 are also suitably mounted on the frame. It will be noted that between adjacent pairs of troughs 104 the track 110 is again lifted to facilitate the raising and lowering of workpieces from and into the abrasive in the troughs, and that the inclination of the housings 40 as they travel is again controlled by inner and outer guides 56' and 52', respectively. In this instance the inner guide 56' is usually continuous as well as the outer guide 52'.

While multiple troughs are employed in Figs. 15 and 16, it is, of course, understood that the workpieces W may be clamped by retainers exactly as shown in Fig. 8, and that the method above described may again be employed for releasing the pressure against the retainers when the workpieces reach a predetermined location.

Furthermore, it is, of course, understood that each trough may be provided with a draining plate similar to the plate 33 before described which terminates thereover and has washing and drying compartments thereon, all as above described; and that each trough may also be provided with means for discharging water and entrained fines as hereinbefore set forth. In other words, except for the utilization of a plurality of troughs instead of a single one, the construction of this modified form may remain substantially the same as that of the machine hereinbefore described and shown and may include, for instance, the means therein shown for tilting the supports at different inclinations for the purposes set forth.

In the modifications illustrated in Figures 17 to 23 inclusive, the machine includes in general a rotary annular horizontally disposed trough 204 adapted to contain a mass of work processing material such as an abrasive slurry 205, power means including an electric motor 206 and a drive unit 207 for rotating the trough 204, the latter being mounted on the output shaft 208 of the drive unit, an endless carrier track 210 having a segment or portion at one end extending above and along a substantial portion of the trough 204, a series of spaced carriers 212 mounted on said track for circulation around the same, each of said carriers having a work holding means 214 thereon, a loading station 216 at one side of said trough and at which workpieces may be placed on and removed from said work holding means, a power driven endless drive chain 218 supported for movement along said track and to which said carriers are attached whereby said carriers may be circulated around said track 210 over said trough 204 and through said loading station 216, said work holding means 214 on said carriers being disposed while said carriers move along said segment of said track above said trough so as to move the workpieces W thereon through the material 205 in the trough while the trough 204 is being rotated for processing said workpieces, and guide means including a continuous track 220 extending along and above the carrier track 210 and cooperable with the work holding means on the carriers 212 for elevating the workpieces carried thereby above the trough as the carriers move from the trough toward the loading station 216 and for lowering the workpieces thereon into the material in said trough 204 as said carriers return from said loading station to said segment.

As each work holding means 214 moves past the loading station 216, the clamping means holding the processed piece of work W is released so that the workpiece may be removed from the work holding means 214 and another piece of work to be processed may be secured to such work holding means. The machine illustrated in this embodiment is particularly adapted for cooperation with an automatic means for loading and unloading workpieces from the work holding means 214. The machine of Figures 17 to 23 inclusive is in many respects the same and otherwise quite similar to the machine of Figures 1 and 2, but differs therefrom principally in that in the machine of Figures 17 and 18 the carrier track 210 is entirely horizontally disposed and the carriers 212 and work holders 214 are different.

In addition the spindle of each work holding means 214 is provided with a sprocket 222 cooperable with a chain 224 for rotating such spindle and the workpiece W carried thereby as the same is moved through the processing material in the trough 204 for rotating the workpiece in such material, thereby bringing all of the surfaces of the work being processed into effective contact with the processing material 205. The chain 224 at one end 226 thereof is anchored to a corner post of the frame 228 of the machine, and the chain 224 extends in the form of a U over the major portion of the trough 204 and over a pulley 230 secured to the opposite corner of the frame of the machine. A weight 232 secured to the free end of the chain 224 serves to keep it under tension and positioned for engagement with the sprockets 222 carried by the work holding means 214 as the latter move the workpieces W carried thereby through the material 205 in the trough 204.

A sprocket 217 mounted on the vertically disposed output shaft 234 of a power transmission 236 drives and supports one end of the carrier drive chain 218. As shown in Figure 21, each of the carriers 212 is connected to a part 240 of the chain 218 by means of a plurality of bolts 242 which pass through openings in flanges 241 thereof and are threaded into threaded openings in a plate 244 affixed to the carrier 212.

The carrier track 210 is entirely horizontally disposed and, as shown in Figures 20 and 22, it includes spaced parallel channels 246 and 248 suitably mounted on the frame of the machine. As will be evident from Figure 17, a major portion of the track 210 overlies the trough 204 while another portion thereof projects laterally beyond the trough 204 so as to provide the loading station 216 at one side of the trough 204. The track 220 overlies the carrier track 210 and includes a segment in one plane above the trough 204 and another segment or portion at a higher elevation above the loading station 216 interconnected by curved portions 221. Spacers 225 affixed to channel 246 and track 220 support the latter.

Each of the carriers 212 is provided with a series of wheels or rollers 250, 252, 254, 256, 257, 258 and 259 for cooperation with the channel members 246 and 248 forming track 210 for supporting the carrier for movement around the track 210. The wheels 250 and 252 roll inside the upper channel 246, the wheels 254 and 256 roll against the underside of the channel 246, the wheel 257 rolls on top of the lower channel 248, while the wheels 258 and 259 roll in the bottom channel 248. Each of the wheels or rollers 250 to 259 is suitably journaled on a stub shaft provided on the carrier 212 and thus supports the carrier for rolling movement around the track 210 under the influence of the chain 218 which is connected as previously described to each of the carriers 212.

The work holding means 214 are movably mounted on the carriers 212 by means of arms 260 and 262 pivoted to the carrier at 264 and 266, respectively, the other ends of the arms 260 and 262 being pivoted to the work holding means 214 whereby the latter may move vertically between the several positions in which the work holding means 214 are illustrated in Figure 18. The elevation of the work holding means 214 is controlled by a roller 270 mounted on a stub shaft 272 which in turn is mounted on the arm 262. The roller 270 rolls in the track 220 and thus, as the carriers are moved around the track 210, the cooperation between the roller 270 and the track 220 will move the work holding means 214 upwardly out of the trough 204 as illustrated in Figure 18 as the carriers move toward the loading station 216. The curved section 221 on one side of the track 220 is disposed so that after the carriers have passed through the loading station 216 the track 220 will cooperate with the roller 270 to lower the work holding means 214 and the workpiece carried thereby down into the trough 204. The lower portion or segment of the track 220 is so spaced with respect to the track 210 above the trough 204 that the work holding means 214 will be in their lower position as each carrier moves around and above the trough 204, thereby moving the work W on the work holding means through the material in the trough 204. However, one of the curved portions 221 of the track 220 is so disposed as to effect the raising of the work holding means 214 as the carriers move away from the trough 204.

As illustrated in Figures 19, 20 and 22, the work holding means comprise spaced tubular members 300 and 302 fixed one above the other to the arms 260 and 262, respectively, one end of the arm 262 carrying a pin 304 which is journaled in a bearing 306 on the member 300, while one end of the arm 260 is provided with a pin 308 which is journaled in a bearing 310 fixed to the tubular member 302. The arms 260 and 262 are of such length and pivoted to the carrier 212 so that the work holding means 214 is maintained substantially vertical in its various positions. A spindle 312 is journaled in bearings in the members 300 and 302, and between the members 300 and 302 the sprocket 222 is keyed to the spindle 312.

The path of movement of the work holding means 214 is indicated at 314 in Figure 17, from which it will be evident that as the carriers circulate around the track 210, the teeth of the sprocket 222 will move into engagement with the chain 224 at approximately the position indicated at 316, the work holding means at such time so positioning the sprocket 222 that it is at the same elevation as the chain 224. Thus as the carrier moves around the track 210 above the trough 204, the sprocket 222 will roll along the chain 224 until the chain 224 and the path 314 of the sprocket diverge at approximately the position indicated at 318. This will rotate the spindle 312 of the work holding means and the workpiece W carried thereby, the latter at such time being submerged within the work processing material in the trough 204. The loop in the chain 224 between the points 316 and 318 thus will be in contact with a series of sprockets 222 which will serve to support the chain 224 between its connection at 226 to the frame of the machine and its engagement with the sprocket 230.

The spindle 312 depends from the member 302 and carries a sleeve 320 on the lower end thereof, the sleeve 320 being slidable axially relative to the spindle 312 and in effect forming an extension thereof. A pin 322 projects above the upper end of the spindle 312 and has a rod 324 affixed thereto and depending therefrom within the spindle 312, the rod 324 at its lower end carrying a cross pin 326 which projects through axially extending, oppositely disposed slots 328 in the spindle 312 and through holes in the sleeve 320.

A coil spring 330 is confined between a stop 332 affixed inside the spindle 312 and a bushing or stop 334 carried by the rod 324 for biasing the rod 324, the cross pin 326, the sleeve 320, and the pin 322 upwardly while permitting downward movement of such parts relative to the spindle 312. A sleeve or bushing 336 of rubber or equivalent material is confined between a ring 338 secured within the lower end of the sleeve 320 by a collar 340 and a ring 342 abutting the lower end of the spindle 312. The spring 330 exerts sufficient pressure on the sleeve 336 so as to compress the same axially and thereby cause the same to frictionally grip the shank or stem 344 of the workpiece which, as shown in Figure 22, is inserted in the lower end of the spindle 312 through the sleeve 336. By exerting downward pressure upon the pin 322, the sleeve 320 may be moved downwardly relative to the spindle 312 so as to permit the sleeve 336 to return to its normal position and release or reduce its grip on the shank or stem 344 of the workpiece, thereby permitting the same to drop by gravity or to be withdrawn from the lower end of the work holding means. At this time the shank or another workpiece may be readily inserted in the sleeve 336, and when the pin 322 is released the spring 330 will be effective to move the sleeve 320 upwardly relative to the spindle 312 for distending the rubber sleeve 336 and clamping the shank of the workpiece in the lower end of the work holding means in order that the workpiece may be carried by the work holding means and moved through the slurry in the trough 204.

At the loading stage an arcuate cam 350 supported by members 352 is arranged above the path 314 and disposed so as to engage the pin 322 on each carrier as it moves along the path so as to depress the pin 322 for the purpose of releasing the work clamping means just described associated with the lower end of the work holding means 314.

In one machine built according to Figures 17 to 23 inclusive the rotary tub or trough 204 is rotated at a speed of about 22 revolutions per minute, thus moving the slurry at a speed of about 600 feet per minute, while the carriers are circulated around the track at a speed of about ten feet per minute, thus completely immersing each part in the slurry of processing material for eighty seconds. The speed of the carriers and of the trough may be varied within wide limits, depending to some extent upon the nature of the workpiece and the nature of the processing operation.

While I have illustrated and described preferred embodiments of my invention, it is understood that these are capable of modification, and I therefore do not wish to be limited to the precise details set forth, but desire to avail myself of such changes and alterations as fall within the purview of the following claims.

I claim:

1. A machine including an annular trough adapted to contain an abrasive mass, said trough being mounted for rotation about a vertical axis, an endless track a portion of which extends over the trough, a series of carriers mounted for movement along the track, means pivoted on each of the carriers for supporting a workpiece, means for circulating said carriers along said track, and guide means secured relative to the track for coaction with the supporting means for imparting pivotal movement thereto as the carriers travel along the track whereby said supporting means extend downwardly during a substantial portion of their travel across the trough so as to carry the workpieces along in the abrasive mass and during another portion of their travel said supporting means carry the workpieces at an elevation above the abrasive mass.

2. The combination in claim 1 wherein a portion of the track extending over the trough is depressed, the track is upwardly and outwardly inclined from opposite ends of the depressed portion, and each outwardly inclined portion extends over one side of the trough.

3. The combination in claim 1 wherein each workpiece supporting means is pivoted for movement about an axis parallel with the path of movement of its carrier along the track.

4. The combination in claim 1 wherein a portion of the track extending over the trough is depressed, said track being upwardly and outwardly inclined from opposite extremities of the depressed portion, each inclined portion extending over one side of the trough, and each workpiece supporting means being pivoted on its carrier for movement about axes extending along and across the path of movement of said carrier, respectively.

5. The combination in claim 1, including a spring urged member on each supporting means for retaining a workpiece on said supporting means, and means mounted on a portion of the track remote from the trough for coaction with said spring urged member whereby said member releases and permits detachment of the workpiece.

6. The combination in claim 1 wherein the guide means extend beneath and substantially parallel with the track for engaging the workpiece supporting means and moving them from side to side in the trough as the workpieces travel substantially longitudinally through the mass of abrasive.

7. The combination in claim 1 wherein the carriers are spaced from one another around the track, an endless chain to which all the carriers are attached, means mounted relative to the track for supporting the chain for movement, means for imparting constant movement to the chain and continuously moving all the carriers around the track, a spring urged member on each supporting means for normally retaining a workpiece thereon, and means mounted relative to the track for coaction with the spring urged members for releasing the workpieces on the supporting means.

8. A machine including a rotary trough adapted to contain an abrasive mass, power means for rotating said trough about a vertical axis, an endless track so mounted relative to the trough that a portion thereof extends over said trough, a plurality of carriers mounted for continuous movement along the track including means for holding them in spaced relation, means on each of the carriers for supporting a workpiece, means for lowering and subsequently raising each workpiece supporting means as it travels over the trough whereby each workpiece is adapted to travel through the abrasive mass as the trough rotates, means for retaining each workpiece on its supporting means, and coacting means on each supporting means and on the track for releasing each retaining means whereby a workpiece when in a raised position may be readily removed from its supporting means and another substituted during the coaction of the means on each supporting means with the means on the track.

9. A machine including a rotary trough adapted to contain an abrasive mass, power means for rotating said trough about a vertical axis an endless track so mounted relative to the trough that a portion thereof extends over said trough, a plurality of carriers mounted for continuous movement along the track including means for holding them in spaced relation, means on the carriers for supporting workpieces, means for lowering each workpiece supporting means and subsequently raising it as it travels over the trough to immerse its workpiece in the abrasive mass as the trough rotates, a draining plate mounted relative to and beneath the track, one margin of the plate projecting inwardly over the trough, said plate extending from the trough beneath the path followed by the workpiece supporting means as they travel from the trough, a stationary washing compartment mounted relative to the track and over the plate through which the workpieces are adapted to pass, means for discharging liquid against the workpieces as they pass through said compartment, said liquid and fines removed from the workpieces thereby being adapted to drop onto the draining plate, and said plate being downwardly inclined towards the trough whereby the liquid and fines are adapted to flow into the trough.

10. The combination in claim 9, including a drying compartment mounted relative to the track and positioned so that workpieces pass therethrough after leaving the washing compartment, and means for discharging air against the workpieces as they travel through the drying compartment.

11. A machine including a trough mounted for rotation and adapted to contain an abrasive mass, an endless track mounted relative to the trough, a portion of the track extending over the trough, a plurality of carriers mounted for continuous movement around the track, means on the carriers for supporting workpieces, means for lowering and subsequently raising each workpiece supporting means as it travels along over the trough whereby the workpieces are immersed in the abrasive mass, a plurality of outwardly flared catch basins projecting from the outer periphery of the trough, said basins being connected to the interior of the trough by openings formed through said outer periphery, screens mounted over the upper faces of the basins, an annular gutter supported relative to the trough and beneath the basins to receive liquid and entrained fines passing therefrom through the screens, and a drain pipe extending from the annular gutter.

12. The combination in claim 11, including a washing compartment mounted relative to the track and trough for the passage therethrough for workpieces on the supporting means after they leave the trough, means in the compartment for discharging liquid against the workpieces as they travel therethrough to remove fines and abrasive therefrom, and a draining plate supported by the trough beneath and relative to said compartment, said plate being downwardly inclined towards the trough and projecting thereover whereby liquid and entrained fines and abrasive material washed from the workpieces are adapted to flow back into the trough.

13. A machine including a plurality of spaced rotary troughs each adapted to contain an abrasive mass, an endless track extending for a portion of its length over each of said troughs, carriers mounted for continuous movement along the track, means on the carriers for supporting workpieces, means mounted relative to the track for lowering and subsequently raising each workpiece supporting means as it travels over each trough whereby each workpiece is immersed in the abrasive mass therein, means on each supporting means for retaining a workpiece thereon, and means mounted on the track for coaction with each retaining means as it passes for releasing the workpiece thereon when the same is in a raised position.

14. The combination in claim 13, including a plurality of washing compartments each mounted relative to the track for the passage of the workpieces therethrough after emerging from one of the troughs, and means in each compartment for discharging liquid against each workpiece as it travels therethrough.

15. A machine of the character described including a rotary horizontally disposed trough adapted to contain a mass of work processing material, power means for rotating said trough, an endless track having a segment extending above and along a substantial portion of said trough, a series of carriers mounted on said track for circulation therearound, each of said carriers including a work holding means mounted thereon for vertical bodily movement relative to said track and trough, a loading station at one side of said trough at which workpieces may be placed on and removed from said work holding means, a power driven endless drive chain supported for movement along said track and to which said carriers are attached whereby said carriers may be circulated around said track over said trough and through said loading station, guide means disposed along said track and having a portion thereof cooperable with said work holding means on said carriers for guiding each of said work holding means as its carrier moves along said segment of said track above said trough, so as to move the workpieces thereon through the material in said trough while said trough is rotated for processing said workpiece, other portions of said guide means being cooperable with each of said work holding means to bodily move the same for elevating the workpiece thereon above said trough as its carrier moves from said segment toward said loading station, and for lowering the workpiece thereon into the material in said trough as said carrier returns from said loading station to said segment, said work holding means including clamping means for engaging and holding the workpiece thereon, and means disposed to react on said clamping means as it moves into said loading station for releasing the same at said loading station.

16. A machine according to claim 15 wherein said track is horizontally disposed and wherein said guide means cooperate with each of said work holding means for moving the same vertically relative to its carrier as such carrier moves between said loading station and said trough.

17. A machine according to claim 15 wherein said track is disposed in two different planes and wherein said guide means cooperate with each of said work holding means for tilting the same as it moves between said loading station and carrier.

18. A machine of the character described including a rotary horizontally disposed trough adapted to contain a mass of work processing material, power means for rotating said trough, an endless track having a segment extending above and along a substantial portion of said trough, a series of carriers mounted on said track for circulation therearound, each of said carriers including a work holding means mounted thereon for vertical bodily movement relative to said track and trough, a loading station at one side of said trough at which workpieces may be placed on and removed from said work holding means, a power driven endless drive chain supported for movement along said track and to which said carriers are attached whereby said carriers may be circulated around said track over said trough and through said loading station, guide means disposed along said track and having a portion thereof cooperable with said work holding means on said carriers for guiding each of said work holding means as its carrier moves along said segment of said track above said trough, so as to move the workpieces thereon through the material in said trough while said trough is rotated for processing said workpiece, other portions of said guide means being cooperable with each of said work holding means to bodily move the same for elevating the workpiece thereon above said trough as its carrier moves from said segment toward said loading station, and for lowering the workpiece thereon into the material in said trough as said carrier returns from said loading station to said segment, and means for rotating the workpiece carried by said work holding means as the workpiece is moved through the work processing material.

19. A machine according to claim 18 wherein said means for rotating said workpieces comprises a sprocket on each work holding means and a chain upon which said sprockets run as said carriers circulate around said track over said trough.

20. A machine of the character described including a rotary horizontally disposed container adapted to contain a mass of work processing material, power means for rotating said container, an endless track having a segment extending above and along a substantial portion of said container, a series of carriers mounted on said track for circulation therearound, each of said carriers including a work holding means, a loading station at one side of said container at which workpieces may be placed on and removed from said work holding means, a power driven endless drive chain supported for movement along said track and to which said carriers are attached whereby said carriers may be circulated around said track over said container and through said loading station, means disposed along said track and having a portion thereof cooperable with said carriers for guiding each of said work holding means as its carrier moves along said segment of said track above said container, so as to move the workpieces thereon through the material in said container while it is rotated for processing said workpiece, and means cooperable with each of said work holding means to bodily move the same for elevating the workpiece thereon above said processing material as its carrier moves from said segment toward said loading station, and for lowering the workpiece thereon into the material as said carrier departs from said loading station.

21. A rotary machine for processing work comprising a rotary horizontally disposed annular trough adapted to contain a mass of work processing material, power means for rotating said trough about a vertical axis, a loading station at one side of said trough, a horizontally disposed endless chain supported for movement in a continuous path around said trough and station, a series of carriers connected with said chain so as to move therewith around said path, power means for driving said chain so as to effect the circulation of said carriers around said path over said trough and through said station, each of said carriers including shiftable work holding means adapted to hold a workpiece and in one position thereof to move such workpiece through the material in said rotating trough as said carriers are circulated by said chain, means cooperable with each of said work holding means for shifting the same to a second position to elevate the workpiece thereon out of said processing material as the carrier in its movement approaches the loading station, said work holding means including clamping means for engaging and holding the workpiece thereon, means disposed to react on said clamping means as it moves into said loading station for releasing the same at said loading station, and means for rotating each workpiece as it is moved through the processing material in said rotating trough.

References Cited in the file of this patent

UNITED STATES PATENTS

| | | |
|---|---|---|
| 886,097 | Vaudreuil | Apr. 28, 1908 |
| 1,566,251 | Myers | Dec. 15, 1925 |
| 2,554,701 | Hackett et al. | May 29, 1951 |
| 2,803,093 | Diehl et al. | Aug. 20, 1957 |